United States Patent [19]

Kittle

[11] 4,026,843
[45] May 31, 1977

[54] FOAMABLE SILICONE GUM STOCK HAVING LESS SKIN THICKNESS

[75] Inventor: Ronald E. Kittle, Midland, Mich.

[73] Assignee: Dow Corning Corporation, Midland, Mich.

[22] Filed: July 14, 1975

[21] Appl. No.: 595,920

[52] U.S. Cl. .................. 260/2.5 S; 260/2.5 D; 260/375 B; 260/46.5 G; 260/46.5 UA; 260/46.5 H; 260/825

[51] Int. Cl.² .................................. C08J 9/02

[58] Field of Search ... 260/2.5 S, 46.5 G, 46.5 UA, 260/46.5 H, 825

[56] References Cited

UNITED STATES PATENTS

| | | | |
|---|---|---|---|
| 3,070,555 | 12/1962 | Bruner, Jr. | 260/2.5 S |
| 3,425,967 | 2/1969 | Modic | 260/2.5 S |
| 3,677,981 | 7/1972 | Wada et al. | 260/2.5 S |
| 3,923,705 | 12/1975 | Smith | 260/2.5 S |

FOREIGN PATENTS OR APPLICATIONS 577,528   6/1959   Canada .................. 260/2.5 S

*Primary Examiner*—Morton Foelak
*Attorney, Agent, or Firm*—Roger H. Borrousch

[57] ABSTRACT

Polydiorganosiloxane gum base stocks which contain per 100 parts by weight of the stock, 5 to 30 parts by weight of an organic alcohol having one C—OH per molecule, 3 to 25 parts by weight of an organosiloxane having an average of at least 2.5 silicon-bonded hydrogen atoms per molecule, 0.05 to 0.5 parts by weight acetylenic alcohol inhibitor and 5 to 20 p.p.m. platinum as a platinum catalyst, can be foamed by heating the composition above 125° C. The sponged products are thin skinned or no skin, elastomeric, have flame retardant properties and can be used where applicatons see relativey high temperatures.

5 Claims, No Drawings

FOAMABLE SILICONE GUM STOCK HAVING LESS SKIN THICKNESS

BACKGROUND OF THE INVENTION

1. Field of the Invention

This invention relates to foamable silicone gum stocks, to the method of preparation and to the foam product.

2. Description of the Prior Art

It is known that silicone rubber can be foamed or sponged by using various blowing agents which release nitrogen or carbon dioxide gas. Berridge in U.S. Pat. No. 2,857,343 describes using blowing agents such as dinitrosopentamethylenetetramine and N,N'-dimethyl-N,N'-dinitrosoterephthalamide with a combination of two peroxide catalysts, tertiary butyl perbenzoate and either benzoyl peroxide or bis-(2,4-dichlorobenzoyl)-peroxide to make silicone rubber sponge. Berridge in U.S. Pat. No. 2,875,163 describes using a heating process before adding the catalysts and blowing agent to improve the final product. Wade and Blanchard in U.S. Pat. No. 2,951,819 describe making cellular rubber-like articles using stearic acid and alkyl metal borohydrides as the blowing agent. Wade et al. also describe using sodium carbonate and p,p-oxybis(benzene sulfonyl hydrazide) as blowing agents for natural and synthetic rubber-like materials. Smith in U.S. Pat. No. 3,238,157 describe making cellular silicone rubber by mixing silicone gums with particulate, solid, void-producing matter, by curing the mixture to a silicone elastomer and thereafter leaching out the particulate matter thereby forming the cellular silicone rubber.

Bond and Tomita in U.S. Pat. No. 3,271,332 describe making a room temperature vulcanizable siloxane foam by adding a basic vulcanization catalyst, such as dibutyltindilaurate to a mixture of 60 to 80 parts by weight of a diorganopolysiloxane fluid gum free of hydroxyl termination having a viscosity of 1,000 to 50,000 cps. at 25° C., 40 to 20 parts by weight of a benzene-soluble silicone resin composed of $R_3SiO_{0.5}$ and $SiO_2$ units, sufficient methyl hydrogen polysiloxane to provide from 0.017 to 0.17 part by weight silanic hydrogen and between 0.1 to 2 parts by weight of a basic vulcanization catalyst active to split off silanic hydrogen.

Modic in U.S. Pat. No. 3,425,967 describes a foamable mixture comprising 100 parts of a vinyl chain-stopped polysiloxane, 10 to 100 parts organopolysiloxane copolymer of $R_3SiO_{0.5}$ and $SiO_2$ units having 2.5 to 10 mole percent silicon-bonded vinyl groups, 10 to 100 parts asbestos or fibrous potassium titanate, 0 to 50 parts of a finely divided inorganic filler, a platinum catalyst, an amount of liquid organohydrogenpolysiloxane to provide from 0.5 to 1.0 silicon-bonded hydrogen atoms per silicon-bonded vinyl group and 1 to 5 parts of a blowing agent, such as azo-isobutyronitrile, dinitrosopentamethylenetetramine, benzenesulfonhydrazide, N,N'-dinitroso-N,N'-dimethylterephthalamide, p,p'-oxy-bis-(benzenesulfonhydrazide), terephthalazide and azodicarbonamide.

Wada, Itoh and Kuga in U.S. Pat. No. 3,677,981 describe foamable silicone elastomeric compositions comprising 80 to 99 parts diorganopolysiloxane gum having a viscosity of at least 1,000,000 cs. at 25° C. and 0.025 to 0.25 moles of vinyl group, 1 to 20 parts of diorganopolysiloxane having a viscosity of at least 10 cs. at 25° C. and at least 10 times as many moles of vinyl group as the gum, an amount of organohydrogenpolysiloxane such that the Si—H linkages are from 50 to 200 mole percent of the total vinyl groups and there are at least three Si—H per molecule, 20 to 100 parts of silica, a catalytic amount of a platinum catalyst and 1 to 10 parts blowing agent such as azobisisobutyronitrile, dinitrosopentamethylenetetramine, N,N'-dimethyldinitrosoterephthalamide and diaminobenzene.

Other than Bond et al. cited above, these references describe heat activated and curing foams. Siloxane foams have also been prepared at room temperature by combining hydroxylated organopolysiloxanes, silicon-bonded hydrogen and tin salts of carboxylic acid such as described by Bruner in U.S. Pat. No. 3,070,555, by Nitzsche et al. in U.S. Pat. No. 3,338,847, Hersh in U.S. Pat. No. 3,429,838, Joyce in U.S. Pat. No. 2,956,032 and Nitzsche et al. in U.S. Pat. No. 3,428,580. More recently, Schuyler B. Smith in an application Ser. No. 519,380, filed Oct. 30, 1974, now U.S. Pat. No. 3,923,705 and assigned to the same assignee as this application described a method of making organosiloxane foams by mixing an organohydrogensiloxane having at least three silicon-bonded hydrogen atoms per molecule, a hydroxylated organosiloxane having from greater than 1.0 to 2.5 silicon-bonded hydroxyl radicals per molecule and a platinum catalyst wherein the molar ratio of silicon-bonded hydrogen atoms to silicon-bonded hydroxyl radicals is from 2.5 to 40 and the viscosity of the mixture is less than 100,000 cps. at 25° C. Smith also describes a method wherein there is also present a benzene-soluble vinyl containing triorganosiloxy endblocked polydiorganosiloxane.

Foams or sponges described above use external blowing agents or use tin salts with silicon-bonded hydrogen to make the foam. The external blowing agents are useful but many are dangerous to handle or there is difficulty in regulating the gas formation from the blowing agent and the curing at the same time. The prior art patents have therefore made various contributions to overcome this problem. Additionally the resulting foam properties required improvement and composition variations were also described by these references to improve the foam properties. Foams could be prepared using tin salts but these foams were not as useful as hoped for, because of properties and stability over broad temperature ranges. Smith in Ser. No. 519,380 describes a more suitable foam which could be used in areas where fire retardancy was required, however, Smith's method required use within a short period of time, once the ingredients were all mixed. It was therefore unexpected that a platinum catalyst could be used to make gum based stocks foam because they require substantial mixing, such as on mills, to prepare the compositions and premature foaming and curing would certainly not be desirable, especially if it occured on the mill. Where these spongeable compositions are described in an application filed on even date herewith by Chi-Long Lee and Gary M. Ronk entitled "Spongeable Silicone Gum Stock" which is assigned to the same party as the present application, disclosed compositions comprise 100 parts be weight of a polydiorganosiloxane gum base stock, 15 to 60 parts by weight of an organosiloxane having silicon-bonded hydroxyl radicals, 3 to 25 parts by weight of an organohydrogensiloxane, 0.05 to 0.5 parts by weight acetylenic alcohol inhibitor and 5 to 20 parts per million of a platinum as a platinum catalyst. Although these compositions formed sponge products, the skin on the cured product was thick and not suitable for all applications. It was therefore desirable to find a way to produce foams or sponges from the gum base stocks which has thinner skins or no skins at all.

SUMMARY OF THE INVENTION

It is an object of this invention to provide foamable silicone gum based compositions which provide foams with thinner skins.

This invention relates to a foamable silicone composition comprising a polydiorganosiloxane gum base stock, an organic alcohol, a siloxane having silicon-bonded hydrogen atoms, a platinum catalyst and a platinum catalyst inhibitor. These compositions can be prepared and stored and foam when heated to provide a foam or sponge product.

DESCRIPTION OF THE INVENTION

This invention relates to a silicone foam composition comprising (A) 100 parts by weight of a polydiorganosiloxane gum base stock, (B) from 5 to 30 parts by weight of an organic alcohol having one C—OH per molecule, (C) from 3 to 25 parts by weight of an organohydrogensiloxane having an average of at least 2.5 silicon-bonded hydrogen atoms per molecule, where the organohydrogensiloxane has from 0.01 to 0.5 parts by weight silicon-bonded hydrogen atoms in the amount of organohydrogensiloxane (C) present, (D) from 0.05 to 0.5 parts by weight of an acetylenic alcohol inhibitor, and (E) from 5 to 20 parts by weight platinum per one million parts by weight silicone composition wherein the platinum is in the form of a platinum catalyst.

The polydiorganosiloxane gum base stock can be any of the gum stocks available commercially and well known in the art. These gum stocks basically comprise a polydiorganosiloxane gum and a reinforcing filler, such as fume silica, and often contain other additives such as plasticizers, heat stability additives, pigments and colorants, extending fillers, flame retardant additives, compression set additives, anti-bloom additives, handling additives and the like. The polydiorganosiloxane gums can generally be described as benzene soluble and having a Williams plasticity of greater than 0.030 inch. The organic groups on the polydiorganosiloxane gums can be any of those found in the commercial gum stocks including methyl, phenyl, vinyl, 3,3,3-trifluoropropyl, among others. These gums are most commonly endblocked with triorganosiloxy units or hydroxyl radicals. The polydiorganosiloxane gum base stocks can be either uncatalyzed or catalyzed with a vulcanizing agent such as an organic peroxide.

The organic alcohols, (B), can be any of the organic alcohols which have one C—OH per molecule. Organic alcohols having other reactive groups with either SiH, SiOH or the platinum catalyst should be absent inasmuch as they tend to interfere with the final product and with storage of the composition. These alcohols include methanol, ethanol, propanol, isopropanol, butanol, hexanol, cyclohexanol, pentanol, octanol and the like.

Optionally, organosiloxanes which contain silicon-bonded hydroxyl radicals can also be present in addition to the organic alcohol. In such mixtures the total SiOH and COH should not exceed a molar ratio of SiH to SiOH + COH of more than 5. These organosiloxanes can be, and preferably so, hydroxyl endblocked polydiorganosiloxane fluids having a viscosity of from 20 to 200 cps. at 25° C., such as hydroxyl endblocked polydimethylsiloxane.

The organohydrogensiloxane, (C), can be any siloxane having an average of at least 2.5 silicon-bonded hydrogen atoms per molecule and an average of no more than one silicon-bonded hydrogen atom per silicon atom. The remaining valences of the silicon atoms are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

$RSiO_{1.5}$, $R_2SiO$, $R_3SiO_{0.5}$,
$RHSiO$, $HSiO_{1.5}$, $R_2HSiO_{0.5}$,
$H_2SiO$, $RH_2SiO_{0.5}$ and $SiO_2$ where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes have an average of at least five silicon-bonded hydrogen atoms per molecule. In the amount of the organohydrogensiloxanes of (C) present in the composition, there is from 0.01 to 0.5 parts by weight silicon-bonded hydrogen atoms. The organohydrogensiloxane is preferably a trimethylsiloxy endblocked polymethylhydrogensiloxane having a viscosity of from 10 to 200 cps. at 25° C.

The acetylenic alcohol inhibitors, (D), are those acetylenic alcohols which are inhibitors for platinum catalyzed compositions at room temperature as described in U.S. Pat. No. 3,445,420 which is hereby incorporated by reference to show this class of inhibitors. Examples of these inhibitors include 3-metyl-1-pentyn-3-ol, 1-ethynylcyclohexan-1-ol, 3,5-dimethyl-1-hexyn-3-ol, 3-phenyl-1-butyn-3-ol and 3-methyl-1-butyn-3-ol.

Platinum catalyst, (E), can be any of the known forms, ranging from platinum as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture. Another preferred platinum catalyst is a chloroplatinic acid catalyst complex as prepared by the method described in U.S. Pat. No. 3,419,593 which is hereby incorporated by reference, where chloroplatinic acid hexahydrate is mixed with symetrical divinyltetramethyldisiloxane to provide the complex. Another similar complex is one prepared from the chloroplatinic acid hexahydrate, symetrical divinyltetramethyldisiloxane, symetrical tetramethyldisiloxane and alcohol solvent. Additional platinum compounds which include, $PtCl_2\{P(CH_2CH_2CH_3)_3\}_2$,
platinum bromides, a complex of platinous halide and an olefin such as ethylene, propylene, butylene, cyclohexene and styrene,
$Pt(CH_3CN)_2Cl_2$, $\{Pt(CH_2CN)_2(CH_3)_4\}Cl_2$, Pt(NH$_3$)$_2$Cl$_2$, K{PtCl$_3$CH$_2$CH$_2$CH$_2$OH},
PtBr$_2$(C$_2$H$_4$)$_2$, K{PtBr$_3$(C$_2$H$_4$)},
PtCl$_2$(C$_2$H$_4$), (CH$_3$)$_2$C=CH$_2$·PtCl$_2$,
H$_2$Pt(CN)$_4$·5H$_2$O, H{PtCl$_3$(CH$_2$CN)},
Pt(NH$_3$)$_2$(CNS)$_2$, PtCl$_2$·PCl$_3$, { Pt(NH$_3$)$_4$}·{PtCl$_4$},
PtCl$_2${P(CH$_2$CH$_3$)$_3$}$_2$, PtCl$_2$·P(OH)$_3$,
PtCl$_2$·P(OCH$_2$CH$_3$)$_3$, PtCl$_2$·{P(OCH$_2$CH$_3$)$_3$}$_2$,
Pt(OOCH$_2$SCH$_2$CH$_3$)$_2$, Pt(CN)$_3$, (CH$_3$)$_4$Pt,
(CH$_3$)$_3$Pt-Pt(CH$_3$)$_3$,

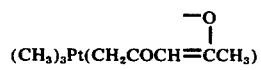

$$(CH_3)_3Pt(CH_2COCH=CCH_3)$$

PtCl$_2$CO and PtBr$_2$CO.

The amounts of ingredients are based on 100 parts by weight of the polydiorganosiloxane gum base stock, (A). The organic alcohol, (B), can be present in amounts from 5 to 30 parts by weight, preferably from 10 to 25 parts by weight. The organohydrogensiloxane, (C), can be present in amounts from 3 to 25 parts by weight, preferably from 5 to 15 parts by weight. The acetylenic alcohol inhibitor, (D), can be present in amounts from 0.05 to 0.5 parts by weight and the platinum catalyst (E) can be present in amounts of from 5 to 20 parts by weight platinum per one million parts by weight silicone composition.

The formable silicone compositions of this invention are best prepared by thoroughly mixing a polydiorganosiloxane gum base stock with a mixture of (B), (C), (D) and (E). The mixing can be done by conventional mixers such as dough type mixers or on a rubber mill. The only precaution should be that the mixture should not see a temperature above the boiling point of the organic alcohol or above the activation temperature which is about 125° C., preferably the temperature is maintained below 100° C.

The foamable silicone compositions which are prepared, can be foamed and cured by heating the composition above 125° C. The composition can be packaged and stored in one container or can be packaged in two or more containers. Packaging where (B), (C) and (E) are not in the same container provides the longest storage life. When heated above 125° C., the composition foams and cures to a foam or sponge product. The foamed products obtained from the compositions disclosed herein have less skin thickness and are uniform. Thus, the foams have lower densities, are more economical because the same amount of starting composition provides a greater volume of foam, because the amount of composition which was used in forming the thick skin now is part of the expanded foam. The foam products are useful as pads, cushions, pillows, insulation and the like and find particular use where fire retardant properties are useful. The fire retardant properties can be improved by adding small amounts of carbon black such as less than 2 weight percent. The foams are useful for applications in buses, trains and airplanes.

The following example is presented for illustrative purposes only and should not be construed as limiting the present invention which is properly delineated in the claims.

EXAMPLE

A commercially available gum base stock comprising a reinforcing silica filled polydimethylsiloxane gum was mixed on a cooled rubber mill which reached a temperature between 50° and 60° C. with mixtures as defined in the Table. The amounts of ingredients shown in the Table were parts by weight and were added as a mixture to 100 parts of the gum base stock.

Ingredient A was a hydroxyl endblocked polydimethylsiloxane having about 4 weight percent silicon-bonded hydroxyl radical.

Ingredient B was a trimethylsiloxy endblocked polymethylhydrogensiloxane having about 1.6 weight percent silicon-bonded hydrogen atom.

Ingredient C was 1-ethynylcyclohexan-1-ol.

Ingredient D was a mixture of 6 parts by weight chloroplatinic acid hexahydrate in 94 parts by weight isopropanol.

Ingredient E was a reinforcing fume silica.

Ingredient F was methanol.

Ingredient G was isopropanol.

All the compositions defined by the Table formed elastomeric foam products after heating at 150° C. The sponges formed were closed cell foams whereas Composition 3 had a thick skin, Compositions 1 and 2 had little or no skin and the foam was more uniform than 3. The foams 1 and 2 had densities about 0.2 to 0.3 grams per cubic centimeter.

Table

| Composition | Ingredient | | | | | | |
| | A | B | C | D | E | F | G |
|---|---|---|---|---|---|---|---|
| 1 | — | 15 | 0.1 | 0.1 | 10 | 10 | — |
| 2 | — | 15 | 0.1 | 0.1 | 10 | — | 20 |
| 3 | 20 | 11 | 0.1 | 0.1 | 10 | — | — |

That which is claimed is:
1. A silicone foam composition comprising
   A. 100 parts by weight of a polydiorganosiloxane gum base stock wherein the gum has a Williams plasticity of greater than 0.030 inch,
   B. from 5 to 30 parts by weight of an organic alcohol having one C—OH per molecule selected from the group consisting of methanol, ethanol, propanol, isopropanol, butanol, hexanol, cyclohexanol, pentanol and octanol,
   C. from 3 to 25 parts by weight of an organohydrogensiloxane having an average of at least 2.5 silicon-bonded hydrogen atoms per molecule, where the organohydrogensiloxane has from 0.01 to 0.5 parts by weight silicon-bonded hydrogen atoms in the amount of organohydrogensiloxane (C) present,
   D. from 0.05 to 0.5 parts by weight of an acetylenic alcohol inhibitor, and
   E. from 5 to 20 parts by weight platinum per one million parts by weight silicone composition wherein the platinum is in the form of a platinum catalyst.

2. The silicone foam composition according to claim 1 in which there is also present from 1 to 20 parts by weight of a reinforcing silica filler additional to any present in the polydiorganosiloxane gum base stock.

3. The silicone foam composition according to claim 2 in which the acetylenic alcohol inhibitor is 1-ethynylcyclohexan-1-ol.

4. The silicone foam composition according to claim 3 in which the organic alcohol of (B) is methanol.

5. The silicone foam composition according to claim 3 in which the organic alcohol of (B) is isopropanol.

* * * * *

UNITED STATES PATENT AND TRADEMARK OFFICE
CERTIFICATE OF CORRECTION

PATENT NO. : 4,026,843
DATED : May 31, 1977
INVENTOR(S) : Ronald E. Kittle

It is certified that error appears in the above-identified patent and that said Letters Patent are hereby corrected as shown below:

In the abstract, line 11 - the word "applicatons" should read "applications"

In the abstract, line 12 - the word "relativey" should read "relatively"

In Column 5, line 28 - the word "formable" should read "foamable"

Signed and Sealed this

Twenty-ninth Day of December 1981

[SEAL]

Attest:

GERALD J. MOSSINGHOFF

Attesting Officer    Commissioner of Patents and Trademarks